United States Patent
Jia et al.

(10) Patent No.: US 11,937,324 B2
(45) Date of Patent: Mar. 19, 2024

(54) DATA TRANSMITTING/RECEIVING APPARATUSES AND METHODS AND COMMUNICATION SYSTEM

(71) Applicant: FUJITSU LIMITED, Kawasaki (JP)

(72) Inventors: Meiyi Jia, Beijing (CN); Lianhai Wu, Beijing (CN); Yulong Shi, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/418,621

(22) Filed: May 21, 2019

(65) Prior Publication Data

US 2019/0274182 A1 Sep. 5, 2019

Related U.S. Application Data

(63) Continuation of application No. PCT/CN2016/111657, filed on Dec. 23, 2016.

(51) Int. Cl.
*H04W 76/27* (2018.01)
*H04L 5/00* (2006.01)
(Continued)

(52) U.S. Cl.
CPC ........... *H04W 76/27* (2018.02); *H04L 5/0082* (2013.01); *H04W 36/26* (2013.01); *H04W 60/00* (2013.01);
(Continued)

(58) Field of Classification Search
None
See application file for complete search history.

(56) References Cited

U.S. PATENT DOCUMENTS 8,917,684 B2 * 12/2014 Kim ..................... H04W 72/005
370/341
10,070,428 B2 * 9/2018 Kwong ............... H04W 72/042
(Continued)

FOREIGN PATENT DOCUMENTS

CN 103178938 A 6/2013
CN 103763748 A 4/2014
(Continued)

OTHER PUBLICATIONS

Notice of Reasons for Refusal issued by the Japanese Patent Office for corresponding Japanese Patent Application No. 2019-524897, dated Jun. 16, 2020, with full English translation attached.
(Continued)

*Primary Examiner* — Clemence S Han
(74) *Attorney, Agent, or Firm* — Myers Wolin, LLC

(57) ABSTRACT

Data transmitting/receiving apparatuses and methods and a communication system. The data transmitting method includes: in an inactive state, determining whether to maintain in the inactive state or enter an active state according to indication information of a network device or one or more parameters configured by the network device; and in the inactive state, transmitting data and/or a request message for entering the active state to the network device. Hence, data transmission may be performed in an appropriate state, without needing to restart connection at each time of data transmission; saved resources may be used for the data transmission, and time needed in performing identical data transmission may be reduced.

4 Claims, 8 Drawing Sheets

(51) Int. Cl.

| | |
|---|---|
| H04W 36/26 | (2009.01) |
| H04W 60/00 | (2009.01) |
| H04W 68/00 | (2009.01) |
| H04W 72/0446 | (2023.01) |
| H04W 76/00 | (2018.01) |
| H04W 80/02 | (2009.01) |

(52) U.S. Cl.
CPC ..... *H04W 68/005* (2013.01); *H04W 72/0446* (2013.01); *H04W 76/00* (2013.01); *H04W 80/02* (2013.01)

(56) References Cited

U.S. PATENT DOCUMENTS

| | | | | |
|---|---|---|---|---|
| 2011/0269463 | A1* | 11/2011 | Wang | H04W 52/0232 455/436 |
| 2012/0082105 | A1* | 4/2012 | Hwang | H04W 76/30 370/329 |
| 2012/0281566 | A1 | 11/2012 | Pelletier et al. | |
| 2013/0028097 | A1* | 1/2013 | Barrett | H04W 60/00 370/241 |
| 2013/0100827 | A1* | 4/2013 | Oliveira | H04W 52/0241 370/248 |
| 2013/0100895 | A1* | 4/2013 | Aghili | H04W 4/00 370/329 |
| 2013/0223335 | A1* | 8/2013 | Kwag | H04W 48/18 370/328 |
| 2015/0092554 | A1* | 4/2015 | Mochizuki | H04W 28/08 370/235 |
| 2015/0146599 | A1* | 5/2015 | Jha | H04L 47/25 370/311 |
| 2015/0189558 | A1* | 7/2015 | Mika | H04W 76/27 370/329 |
| 2015/0373733 | A1* | 12/2015 | Bangolae | H04W 72/0406 370/329 |
| 2016/0007388 | A1* | 1/2016 | Ianev | H04W 76/10 455/450 |
| 2016/0014037 | A1* | 1/2016 | Hu | H04W 28/0273 370/392 |
| 2016/0021646 | A1* | 1/2016 | Hu | H04W 72/1278 370/329 |
| 2016/0044002 | A1* | 2/2016 | Ying | H04L 63/0428 713/168 |
| 2016/0044713 | A1* | 2/2016 | Du | H04W 74/0833 370/329 |
| 2016/0057797 | A1* | 2/2016 | Bangolae | H04W 72/10 370/311 |
| 2016/0095065 | A1 | 3/2016 | Richards | |
| 2016/0302153 | A1 | 10/2016 | Martin et al. | |
| 2016/0309379 | A1 | 10/2016 | Pelletier et al. | |
| 2017/0251516 | A1* | 8/2017 | Bangolae | H04W 76/10 |
| 2017/0367116 | A1* | 12/2017 | Li | H04W 72/048 |
| 2018/0092157 | A1* | 3/2018 | Chen | H04W 76/27 |
| 2018/0110082 | A1* | 4/2018 | Saily | H04W 76/27 |
| 2018/0116000 | A1* | 4/2018 | Ly | H04W 74/006 |
| 2018/0124636 | A1* | 5/2018 | Ly | H04L 5/0048 |
| 2018/0176834 | A1* | 6/2018 | Wei | H04W 36/0016 |
| 2018/0302914 | A1* | 10/2018 | da Silva | H04W 72/1289 |
| 2018/0332561 | A1* | 11/2018 | Da Silva | H04W 68/02 |
| 2019/0037622 | A1* | 1/2019 | Blasco Serrano | H04W 76/14 |
| 2019/0174571 | A1* | 6/2019 | Deenoo | H04W 76/11 |
| 2019/0191483 | A1* | 6/2019 | Ryoo | H04W 12/04033 |
| 2019/0246445 | A1* | 8/2019 | Centonza | H04W 76/27 |
| 2019/0254109 | A1* | 8/2019 | Lee | H04W 76/27 |
| 2019/0268831 | A1* | 8/2019 | Lee | H04W 48/04 |
| 2019/0289660 | A1* | 9/2019 | Yi | H04W 76/27 |
| 2020/0029326 | A1* | 1/2020 | Wang | H04W 56/0045 |
| 2020/0260402 | A1* | 8/2020 | Adjakple | H04W 68/005 |

FOREIGN PATENT DOCUMENTS

| | | |
|---|---|---|
| CN | 105580488 A | 5/2016 |
| KR | 10-2013-0069778 A | 6/2013 |
| WO | 2014/174242 A1 | 10/2014 |

OTHER PUBLICATIONS

LG Electronics Inc., "UL data transmission in RRC_Inactive" 3GPP TSG RAN WG2 Meeting #96, R2-168280, 3GPP, Reno, NV, USA, Nov. 14-18, 2016.

Notice of Reasons for Refusal issued by the Japan Patent Office for corresponding Japanese Patent Application No. 2019-524897, dated Mar. 3, 2020, with an English translation.

Samsung, "Overall procedure for data transfer in inactive state", Agenda Item: 9.2.2.1, 3GPP TSG-RAN WG2 Meeting #96, R2-168051, Reno, USA, Nov. 14-18, 2016.

Intel Corporation, "Data transfer from NR_RRC_INACTIVE", Agenda Item: 9.2.2.1, 3GPP TSG-RAN WG2 Meeting #96, R2-168522, Reno, USA, Nov. 14-18, 2016.

Huawei et al., "The procedure to activate RRC inactive connected mode", Agenda Item: 6.10.3, 3GPP TSG-SA WG2 Meeting #117, S2-165732, Kaohsiung City, Taiwan, Oct. 17-21, 2016.

Intel Corporation, "Details on the NR_RRC_INACTIVE state", Agenda Item: 9.2.2.1, 3GPP TSG-RAN WG2 Meeting #96, R2-168523, Reno, USA, Nov. 14-18, 2016.

Ericsson, "Responding the questions on small data Tx in RRC_ INACTIVE", Agenda Item: 9.2.2.1, 3GPP TSG-RAN WG2 Meeting #96, R2-168714, Reno, USA, Nov. 14-18, 2016.

CATT, "An alternative to Activate RRC_inactive_connected state", Agenda Item: 6.10.3, 3GPP TSG-SA WG2 Meeting #117, S2-165795, Kaohsiung City, Taiwan, Oct. 17-21, 2016.

First Notification of Office Action issued by the China National Intellectual Property Administration for corresponding Chinese Patent Application No. 201680090326.5, dated Jun. 16, 2020; with full English translation attached.

Search report issued issued by the China National Intellectual Property Administration for corresponding Chinese Patent Application No. 201680090326.5, dated Jun. 16, 2020; with full English translation attached.

International Search Report issued by the State Intellectual Property Office of the P.R. China for corresponding International Patent Application No. PCT/CN2016/111657, dated Aug. 29, 2017, with an English translation.

Written Opinion of the International Searching Authority issued by the State Intellectual Property Office of the P.R. China for corresponding International Patent Application No. PCT/CN2016/111657, dated Aug. 29, 2017, with an English translation.

Notice of Preliminary Rejection issued by the Korean Intellectual Property Office for corresponding Korean Patent Application No. 10-2019-7015296, dated Jul. 17, 2020 with an English translation.

Ericsson, "Baseline Solution for Small Data Transmission in RRC_ INACTIVE," 3GPP TSG-RAN WG2 #96, Agenda Item 9.2.2.1, Tdoc R2-168713, Nov. 14-18, Reno, Nevada, USA. 2016.

ITRI, "State Transition between Connected and Inactive," 3GPP TSG-RAN WG2 #96, Agenda item 9.2.2.1, Tdoc R2-168067, Nov. 14-18, 2016, Reno, USA.

Extended European search report with supplementary European search report and the European search opinion issued by the European Patent Office for corresponding European Patent Application No. 16924419.1, dated Aug. 26, 2020.

Second Notification of Office Action and Search Report issued by the China National Intellectual Property Administration, for corresponding Chinese Patent Application No. 201680090326.5, dated Jan. 26, 2021, with an English translation.

Third Notification of Office Action issued by the China National Intellectual Property Administration for corresponding Chinese Patent Application No. 201680090326.5, dated Jun. 2, 2021, with an English translation.

Decision of Rejection issued by the China National Intellectual Property Administration for corresponding Chinese Patent Application No. 201680090326.5, dated Dec. 2, 2021, with an English translation.

(56) References Cited

OTHER PUBLICATIONS

Communication pursuant to Article 94(3) EPC issued by the European Patent Office for corresponding European Patent Application No. 16 924 419.1-1206 dated Nov. 15, 2022.
3GPP TS 36.331 V13.3.0., "3rd Generation Partnership Project; Technical Specification Group Radio Access Network; Evolved Universal Terrestrial Radio Access (E-UTRA); Radio Resource Control (RRC); Protocol specification (Release 13)", Sep. 2016.
3GPP TS 38.331 V15.0.0., "3rd Generation Partnership Project; Technical Specification Group Radio Access Network; NR; Radio Resource Control (RRC) protocol specification; (Release 15)", Dec. 2017.
Decision of Reexamination issued by the China National Intellectual Property Administration for corresponding Chinese Patent Application No. 201680090326.5, dated Mar. 31, 2023, with an English translation.

\* cited by examiner

DATA TRANSMITTING/RECEIVING APPARATUSES AND METHODS AND COMMUNICATION SYSTEM

CROSS REFERENCE TO RELATED APPLICATIONS

This application is a continuation application of International Application PCT/CN2016/111657 filed on Dec. 23, 2016, the entire contents of which are incorporated herein by reference.

TECHNICAL FIELD

This disclosure relates to the field of communication technologies, and in particular to data transmitting/receiving apparatuses and methods and a communication system.

BACKGROUND

In a long-term evolution (LTE) system or an LTE-A (LTE Advanced) system, a user equipment (UE) may be in an idle state or an active state (which may also be referred to as a connected state, or a fully connected state).

A user equipment in the active state may perform data transmission at any time, and a user equipment in the idle state needs first to establish a connection (for example, a radio resource control (RRC) connection) when there exist data needing to be transmitted, and then performs data transmission; for example, the user equipment enters an RRC activation state (denoted by RRC_ACTIVE).

In a new radio (NR) system or a fifth-generation (5G) system, an inactive state of a radio access network (RAN) has been introduced; for example, a user equipment enters an RRC inactive state (denoted by RRC_INACTIVE).

The RRC inactive state may be used for low activity, and should at least meet a delay requirement of a control plane in the NR, and energy consumption equivalent to that in the idle state in the LTE needs to be achieved. For the user equipment in the RRC inactive state, the connection between the RAN and a core network, including the control plane and the user plane, should be maintained; and a notification procedure initiated by the RAN is used to achieve downlink reachability of the user equipment. And furthermore, the RAN should be notified when the user equipment moves from one "RAN-based notification area" to another area.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the RRC inactive state, there exists such a mechanism that the user equipment is made to enter a connection state (or may be referred to as an RRC_connected state, such as an RRC active state) and perform data transmission in the state. Furthermore, RAN 2 will study that a user equipment performs data transmission directly in the RRC inactive state, without needing a state transition procedure of entering the RRC active state from the RRC inactive state; and RAN 2 further evaluates the following two methods: performing data transmission together with an initial RRC message used for transitioning a state into an RRC active state; alternatively, performing data transmission in an RRC inactive state, with no RRC message concerned.

For example, regarding uplink data transmission in the RRC inactive state, there are two alternative methods:
method 1: entering an RRC active state (i.e. full connection) first, and then transmitting uplink data, by a user equipment;
method 2: transmitting uplink data in an RRC inactive state by a user equipment, with no transition from an RRC inactive state to the RRC active state.

However, it was found by the inventors that it is difficult for the user equipment in the current schemes to determine whether the data are transmitted in the RRC inactive state or are transmitted after entering the RRC active state. Hence, the data transmission is not easily performed in an appropriate state.

Embodiments of this disclosure provide data transmitting/receiving apparatuses and methods and a communication system, in which a user equipment is able to determine whether data are transmitted in an RRC inactive state or are transmitted after entering an RRC active state. Hence, the data transmission may be performed in an appropriate state.

According to a first aspect of the embodiments of this disclosure, there is provided a data transmitting method, including:
in an inactive state, determining whether to maintain in the inactive state or enter an active state according to indication information of a network device or one or more parameters configured by the network device; and
in the inactive state, transmitting data and/or a request message for entering the active state to the network device.

According to a second aspect of the embodiments of this disclosure, there is provided a data transmitting apparatus, including:
a determining unit configured to, in an inactive state, determine whether to maintain in the inactive state or enter an active state according to indication information of a network device or one or more parameters configured by the network device; and
a transmitting unit configured to, in the inactive state, transmit data and/or a request message for entering the active state to the network device.

According to a third aspect of the embodiments of this disclosure, there is provided a data receiving method, including:
transmitting indication information to a user equipment or configuring one or more parameters for the user equipment, the user equipment determines whether to maintain in an inactive state or enter an active state according to the indication information or the parameters; and
receiving data and/or a request message for entering the active state transmitted by the user equipment in the inactive state.

According to a fourth aspect of the embodiments of this disclosure, there is provided a data receiving apparatus, including:
a configuring unit configured to transmit indication information to a user equipment or configure one or more parameters for the user equipment, the user equipment determines whether to maintain in an inactive state or enter an active state according to the indication information or the parameters; and
a receiving unit configured to receive data and/or a request message for entering the active state transmitted by the user equipment in the inactive state.

According to a fifth aspect of the embodiments of this disclosure, there is provided a communication system, including:

a user equipment, including the data transmitting apparatus as described in the second aspect; and a network device, including the data receiving apparatus as described in the fourth aspect.

An advantage of the embodiments of this disclosure exists in that in an inactive state, the user equipment determines whether to maintain in the inactive state or enter an active state according to indication information of a network device or one or more parameters configured by the network device. Hence, data transmission may be performed in an appropriate state, without needing to restart connection at each time of data transmission; saved resources may be used for the data transmission, and time needed in performing identical data transmission may be reduced.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals assign corresponding parts throughout the several views and may be used to assign like or similar parts in more than one embodiment.

DETAILED DESCRIPTION

Figure 1:
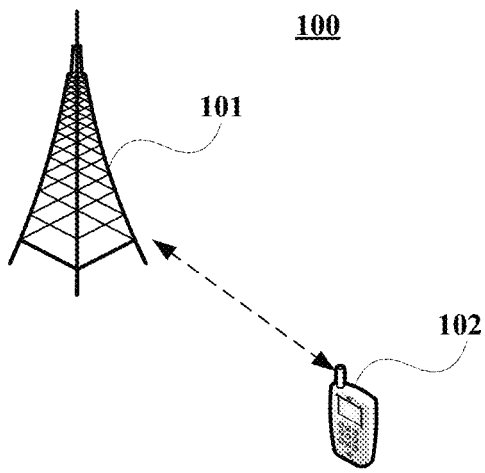
FIG. 1 is a schematic diagram of a communication system of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses a terminal device to the communication network and provides services for the terminal device. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC).

In an embodiment, the base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

In an embodiment, the user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Scenarios in the embodiments of this disclosure shall be described below by way of examples; however, this disclosure is not limited thereto.

FIG. 1 is a schematic diagram of a communication system of an embodiment of this disclosure, in which a case where a user equipment and a network device are taken as examples is schematically shown. As shown in FIG. 1, a communication system 100 may include a network device 101 and a user equipment 102 (for the sake of simplicity, FIG. 1 shall be described by taking only one user equipment as an example).

In the embodiment of this disclosure, existing traffics or traffics that may be implemented in the future may be performed between the network device 101 and the user equipment 102. For example, such traffics may include but not limited to an enhanced mobile broadband (eMBB), massive machine type communication (MTC), and ultra-reliable and low-latency communication (URLLC).

The user equipment 102 may transmit data to the network device 101. And the network device 101 may receive data transmitted by one or more user equipments 102, and feed back information (such as acknowledgement (ACK)/non-acknowledgement (NACK)) to the user equipments 102.

Following description shall be given by taking that a network device in a communication system is taken as a data receiving device and a user equipment is taken as a data transmitting device as an example. However, this disclosure is not limited thereto, and the transmitting device and/or the receiving device may also be other devices.

Embodiment 1

These embodiments of this disclosure provide a data transmitting method, applicable to a data transmitting device side (such as a user equipment).

Figure 2:
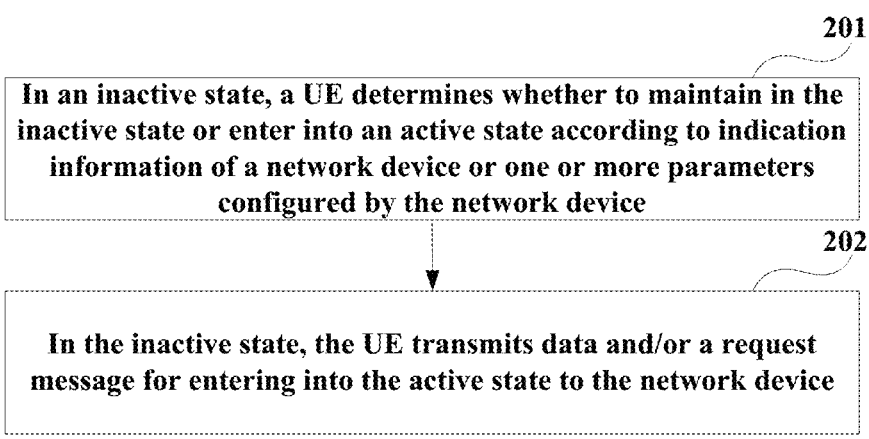
FIG. 2 is a schematic diagram of the data transmitting method of Embodiment 1 of this disclosure.

FIG. 2 is a schematic diagram of the data transmitting method of the embodiment of this disclosure. As shown in FIG. 2, the data transmitting method includes:

201: in an inactive state, a user equipment determines whether to maintain in the inactive state or enter an active state according to indication information of a network device or one or more parameters configured by the network device; and 202: in the inactive state, the user equipment transmits data and/or a request message for entering the active state to the network device.

In an embodiment, the request message for entering the active state may be, for example, an RRC request message. The user equipment in the inactive state may transmit data together with the RRC request message, or may transmit data without carrying the RRC request message.

In an embodiment, when the user equipment transmits the data and/or the RRC request message to the network device in the inactive state, the user equipment may further transmit data amount information indicating a total amount or a maintaining amount of the data. For example, when the user equipment transmits data to the network device for the first time, a total amount (for example, 30 bits) of the data or a maintaining amount (for example, 20 bits) of the data after this time of data transmission (for example, 10 bits) may be attached.

Furthermore, the data amount information may not be limited to a quantity value, and may be a relative value similar to a buffer status report (BSR). For example, "1" corresponds to 0-20 bits and "2" corresponds to 21-40 bits, when the user equipment transmits data to the network device for the first time, it may attach "1" to indicate that a maintaining amount after this time of data transmission is 0-20 bits.

Furthermore, the data amount information may also indicate a relative relationship with a certain predetermined threshold, which may indicate that a total amount (or a maintaining amount) of the data transmission is greater than or less than the predetermined threshold. For example, if the predetermined threshold is 20 bits, the user equipment may attach information indicating "being less than" in transmitting the data to the network device for the first time, indicating that the maintaining amount after this time of data transmission is less than 20 bits.

It is to be noted that the foregoing merely describes the data amount information when the data are transmitted; however, this disclosure is not limited thereto. How to transmit data and/or the request message and how to determine whether to maintain in an inactive state or enter an active state shall be illustrated below.

In one embodiment, when the user equipment has data needing to be transmitted, in the inactive state, the user equipment may transmit the data and the request message for entering the active state to the network device. And the network device may determine whether the user equipment enters the active state and transmit indication information (which is, for example, carried in an RRC rejection message) to the user equipment.

Figure 3:
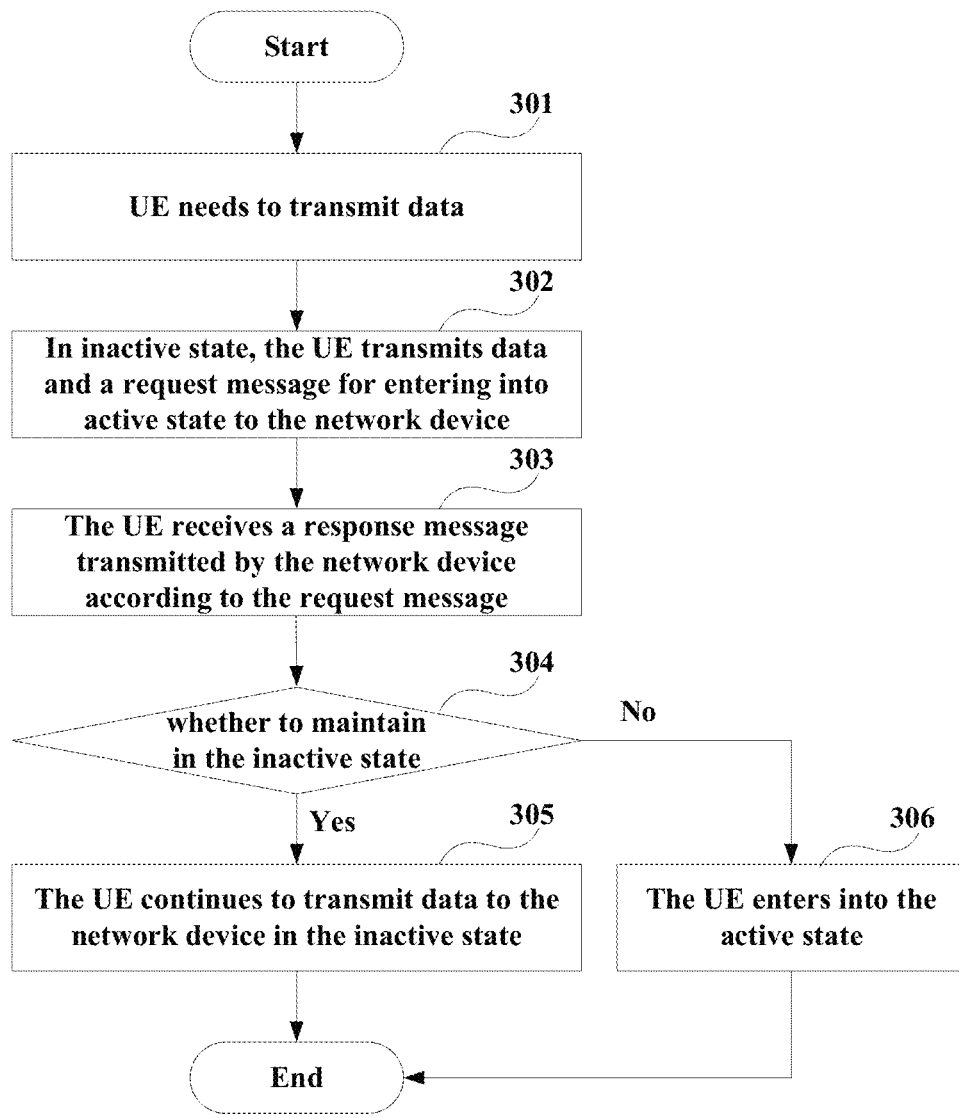
FIG. 3 is another schematic diagram of the data transmitting method of Embodiment 1 of this disclosure.

FIG. 3 is another schematic diagram of the data transmitting method of the embodiment of this disclosure, which shall be described from the user equipment side. As shown in FIG. 3, the data transmitting method includes:

301: a user equipment needs to transmit data.

302: in the inactive state, the user equipment transmits the data and the request message for entering the active state (such as an RRC request message) to the network device.

In an embodiment, the network device (such as a gNB) may determine whether to enable the user equipment to enter the active state according to information provided by the user equipment (such as a buffer status report (BSR), and a size of a data amount), available resources in the network system, and the like.

If the network device determines to enable the user equipment to maintain in the inactive state to perform data transmission, the network device may transmit an RRC response message to the user equipment, indicating that the user equipment maintains in the RRC inactive state. The RRC response message may, for example, use a new message or reuse an existing rejection message.

For example, the indication information may be contained in a newly-added information element (IE) of an existing message (such as an RRC rejection message, and an RRC connection reconfiguration message), or may be contained in a media access control (MAC) control element (CE); however, this disclosure is not limited thereto.

And the RRC response message may further carry some assistant information, such as a new rejection cause, indicating that the rejection message is used to indicate that the user equipment maintains in the RRC inactive state. Otherwise, the network device may use an existing RRC connection establishment (or resume or reconfiguration) procedure to enable the user equipment to enter the RRC active state.

- 303: the user equipment receives a response message transmitted by the network device according to the request message.
- 304: the user equipment determines whether the response message indicates to maintain in the inactive state, executing operation 305 if yes, and executing operation 306 if no (that is, indicating entering the active state).
- 305: the user equipment continues to transmit data to the network device in the inactive state.

In an embodiment, the user equipment may terminate the data transmission in receiving the RRC rejection message or the new message; furthermore, if there exist maintaining available data, the previous data transmission procedure may be repeated, that is, in the inactive state, transmitting the data and the request message for entering the active state to the network device in operation 302.

Alternatively, the user equipment may also transmit data to the network device within a preconfigured time, and/or transmit data to the network device within a preconfigured number of times. In a case where the preconfigured time and/or the preconfigured number of times is/are exceeded, the previous data transmission procedure may be repeated, that is, in the inactive state, transmitting the data and the request message for entering the active state to the network device in operation 302.

For example, within a time T when the RRC rejection message is received, the user equipment may transmit uplink (UL) data without carrying an RRC message; where, a value of T may be broadcast by the network device, or may be notified by using an RRC-specific message (such as an RRC reconfiguration message, an RRC Rejecting message) or a new message. After time T, if there still exist maintaining available data, an RRC message needs to be carried, and then the process of operation 302 is repeated.

For another example, after receiving the RRC rejection message, the user equipment may transmit UL data up to N times, without carrying the RRC message; where, a value of N may be broadcast by the network device, or may be notified by using an RRC-specific message (such as an RRC reconfiguration message, an RRC Rejecting message) or a new message. After transmitting data N times, if there still exist maintaining available data, an RRC message needs to be carried, and then the process of operation 302 is repeated.

It is to be noted that the above description is given by taking N and T as an example; however, this disclosure is not limited thereto, and any combination of N and T is not excluded. Furthermore, N and T may also be predefined in a protocol or standard, and this disclosure is not limited thereto.

- 306: the user equipment enters the active state.

In an embodiment, if the network device indicates that the user equipment enters the active state, an existing RRC connection establishment/resume/reconfiguration procedure may be used to enable the user equipment to enter the RRC active state, and reference may be made to related techniques for details.

It should be noted that the embodiment of this disclosure is only illustrated in FIG. 3; however, this disclosure is not limited thereto. For example, an order of execution of the operations may be appropriately adjusted; and furthermore, some other operations may be added, or some of these operations may be reduced. And appropriate variants may be made by those skilled in the art according to what is described above, without being limited to the disclosure contained in FIG. 3.

Figure 4:
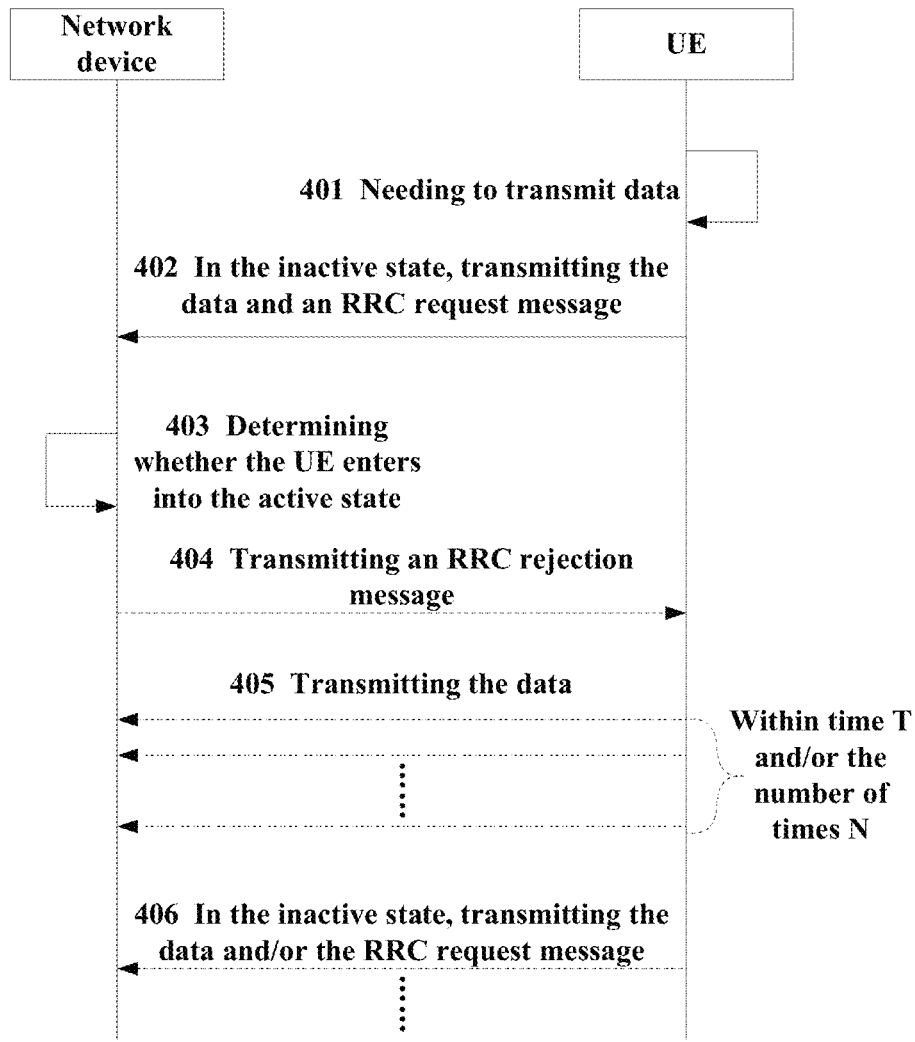
FIG. 4 is a further schematic diagram of the data transmitting method of Embodiment 1 of this disclosure.

FIG. 4 is a further schematic diagram of the data transmitting method of the embodiment of this disclosure, which shall be described from the user equipment side and the network device side. As shown in FIG. 4, the data transmitting method includes:

- 401: the user equipment needs to transmit data.
- 402: in the inactive state, the user equipment transmits the data and an RRC request message to the network device.
- 403: the network device determines whether the user equipment enters the active state according to the request message.

In an embodiment, the network device (such as a gNB) may determine whether to enable the user equipment to enter the active state according to information provided by the user equipment (such as BSR), and available resources in the network system, etc. If the network device determines that the user equipment enters the active state, an existing RRC connection establishment/resume/reconfiguration procedure may be used; and if the network device determines to maintain the user equipment in the inactive state, operation 404 may be executed.

- 404: the network device transmits an RRC rejection message to the user equipment.

In an embodiment, if the user equipment still has data needing to transmitted, operation 405 may be executed.

- 405: the user equipment transmits the data to the network device within the preconfigured time T and/or number N of times.

In an embodiment, the user equipment may transmit the data but does not transmit an RRC request message within time T and/or number N of times; and if the user equipment still has data needing to transmitted when time T and/or number N of times is/are exceeded, operation 406 may be executed.

- 406: in the inactive state, the user equipment transmits the data and/or the RRC request message to the network device.

It should be noted that the embodiment of this disclosure is only illustrated in FIG. 4; however, this disclosure is not limited thereto. For example, description is given in FIG. 4 by taking the RRC request message and the RRC rejection message as examples. However, this disclosure is not limited thereto, and they may also be other messages.

In another embodiment, when the user equipment has data needing to transmitted, in the inactive state, the user equipment may transmit the data to the network device (for example, it does not transmit the RRC request message). For example, in the inactive state, the user equipment transmits the data and the request message for entering the active sate to the network device only when the network device specifically indicates that the user equipment enters the active sate.

Figure 5:
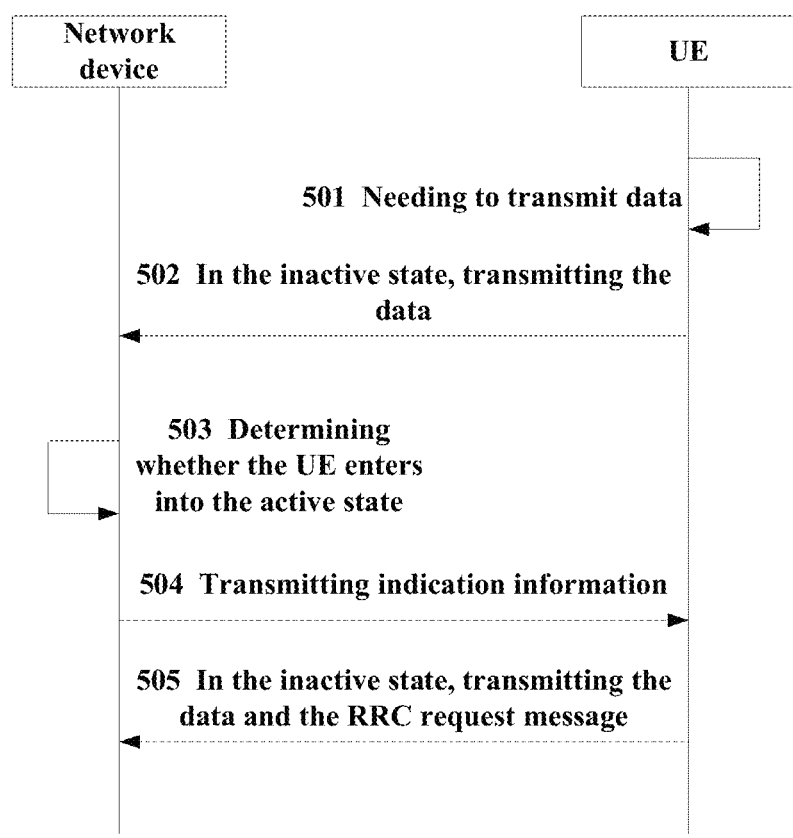
FIG. 5 is yet another schematic diagram of the data transmitting method of Embodiment 1 of this disclosure.

FIG. 5 is yet another schematic diagram of the data transmitting method of the embodiment of this disclosure, which shall be described from the user equipment side and the network device side. As shown in FIG. 5, the data transmitting method includes:

501: the user equipment needs to transmit data.

502: in the inactive state, the user equipment transmits the data to the network device.

In an embodiment, the user equipment may transmit uplink data only and does not carry an RRC message according to an uplink grant or a preconfigured common resource.

503: the network device determines whether the user equipment enters the active state.

In an embodiment, the network device may determine whether the user equipment enters the active state. For example, the network device may determine whether to enable the user equipment to enter the active state according to a BSR provided by the user equipment, or other equivalent information, available resources in the network system, etc.

For example, the information provided by the user equipment may include indication information, and information indicating a size of maintaining data after the data are transmitted, which may be, for example, a particular number of bits, or a level value based on a predefinition, or a relationship with a predefined level value (such as being greater than or less than); however, this disclosure is not limited thereto.

In this embodiment, if the network device determines that the user equipment enters the active state, operation 504 may be executed; and if the network device determines to maintain the user equipment in the inactive state, the user equipment may continue to transmit uplink data in the inactive state, as described in operation 502.

504: the network device transmits indication information indicating to enter the active state to the user equipment.

In an embodiment, if the network device determines that the user equipment needs to enter the RRC active state to transmit data, it may transmit an explicit indication to the user equipment, informing that the user equipment needs to enter the RRC active state. The indication may be an RRC message (such as reusing an existing RRC connection establishment/resume/reconfiguration message), or may be an introduced new message; or it may use a new media access control (MAC) control element (CE) to enable the user equipment to enter the active state.

For example, the indication information may be contained in a newly-added IE of an existing message (such as an RRC connection establishment/resume/reconfiguration message), or may be contained in an MAC CE; however, this disclosure is not limited thereto.

505: in the inactive state, the user equipment transmits the data and the RRC request message to the network device.

In an embodiment, once the user equipment receives the indication information, it may execute an RRC connection establishment/resume/reconfiguration procedure to enter the RRC active state.

In another embodiment, when the user equipment needs to transmit data, it may transmit the data to the network device in the inactive state. For example, in the inactive state, the user equipment transmits the data and the request message for entering the active state to the network device only when one or more predetermined conditions is/are satisfied.

Figure 6:
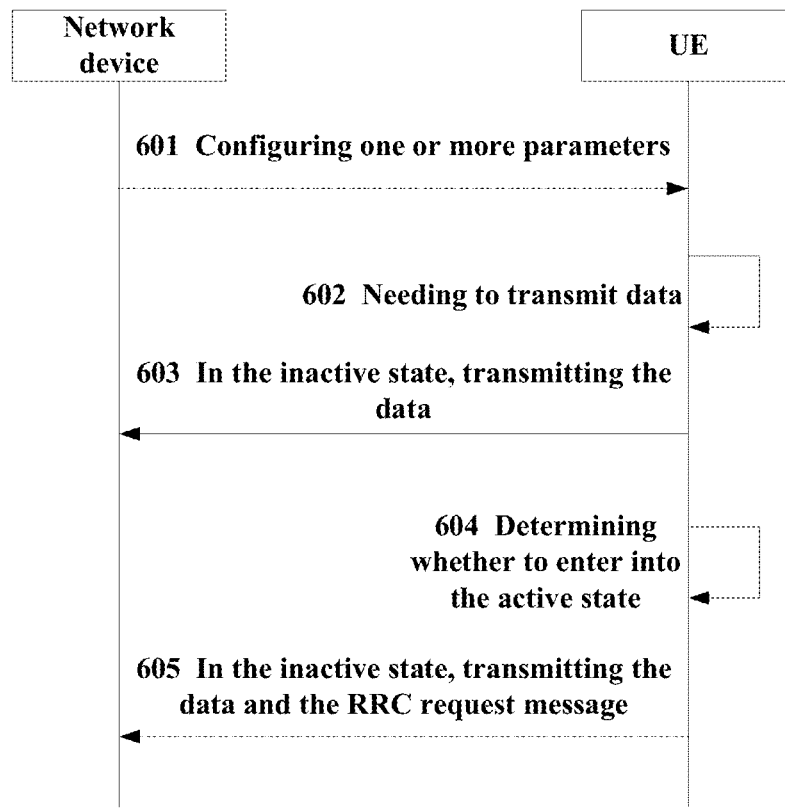
FIG. 6 is still another schematic diagram of the data transmitting method of Embodiment 1 of this disclosure.

FIG. 6 is still another schematic diagram of the data transmitting method of the embodiment of this disclosure, which shall be described from the user equipment side and the network device side. As shown in FIG. 6, the data transmitting method includes:

601: the network device preconfigures one or more parameters for the user equipment.

In an embodiment, in order to assist the user equipment in making decision, the network device may configure some parameters in advance for the user equipment via broadcast or dedicated signaling. However, this disclosure is not limited thereto; for example, these parameters may also be predefined in a protocol or standard.

For example, the parameters configured by the network device may include one or more of the following: a threshold of an available data amount, a threshold of an interval time of data transmission, a minimum time interval between consecutive packets, and the number of packets. However, this disclosure is not limited thereto, and other parameters may also be included.

Figure 7:
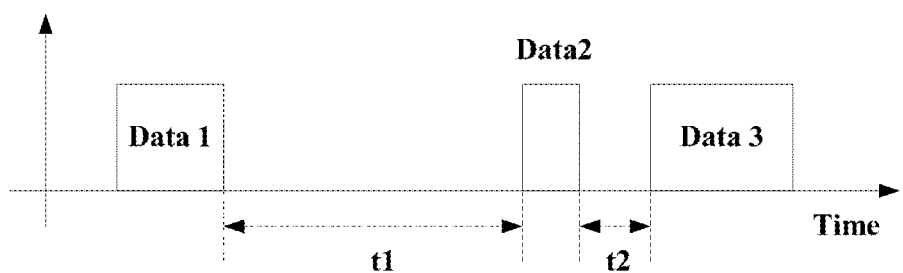
FIG. 7 is an exemplary diagram of the packet of Embodiment 1 of this disclosure.

FIG. 7 is an exemplary diagram of the packet of the embodiment of this disclosure. As shown in FIG. 7, an expected service model may include packets of different sizes, and time intervals between the packets are variable. Hence, the preconfigured parameters may include:

$T_{INACTIVE}$: a minimum time interval between consecutive packets; and $N_{INACTIVE}$: the number of packets.

According to these configured parameters, the user equipment may determine by itself whether to enter the RRC active state or maintain in the RRC inactive state to perform data transmission. It should be noted that the above parameters are merely some examples of this disclosure, and this disclosure is not limited thereto.

602: the user equipment needs to transmit data.

603: in the inactive state, the user equipment transmits the data to the network device.

In an embodiment, the user equipment may transmit uplink data only and does not carry an RRC message according to an uplink grant or a preconfigured common resource.

604: the user equipment determines whether to enter the active state.

In an embodiment, the user equipment may determine whether one or more preset conditions is/are satisfied according to the parameters configured by the network device, and determine needing to enter the active state when the one or more preset conditions is/are satisfied.

For example, if an amount of available data reaching the user equipment is greater than a threshold (the threshold of an available data amount), the user equipment may determine to enter the RRC active state to perform data transmission; otherwise, the user equipment transmit the data in the RRC inactive state.

If $T_{INACTIVE}$ and/or $N_{INACTIVE}$ is/are configured, a timer may be correspondingly started and a counter may be activated. In a case where there still exist data after the first time of data transmission, if the timer expires, the user equipment may perform the data transmission in the RRC inactive state.

If the timer is still running, and if the network device does not configure $N_{INACTIVE}$, the user equipment may determine to enter the RRC active state to transmit data. Otherwise, if the network device configures $N_{INACTIVE}$ and a value of the counter is less than $N_{INACTIVE}$, the user equipment may perform the data transmission in the RRC inactive state, and 1 is added to the counter; and if the value of the counter is equal to $N_{INACTIVE}$, the user equipment may determine to enter the RRC active state to transmit data.

For another example, if the amount of available data reaching the user equipment is greater than a threshold (the threshold of an available data amount), the user equipment enters the RRC active state to perform data transmission; otherwise, the user equipment transmits data in the RRC inactive state.

If $T_{INACTIVE}$ and/or $N_{INACTIVE}$ is/are configured, the timer is correspondingly started and the counter is activated. In a case where there exist still data after the first time of data transmission, the user equipment may compare the value of the counter. If the value of the counter is less than $N_{INACTIVE}$, the user equipment may perform the data transmission in the RRC inactive state. If the value of the counter is equal to $N_{INACTIVE}$ and if the timer $T_{INACTIVE}$ expires, the user equipment may perform the data transmission in the RRC inactive state and restart the timer $T_{INACTIVE}$; and if the timer $T_{INACTIVE}$ does not expire, the user equipment may enter the RRC active state to perform data transmission.

It should be noted that once the procedure of entering the RRC active state is initiated, both the timer and the counter are deactivated. Furthermore, this disclosure is not limited to the above examples, and for example, besides the combinations listed in the above two examples, other combinations are not excluded.

In an embodiment, when an amount of data reaching the user equipment side is taken into account, calculation may be performed only when a certain number of data is reached (such as exceeding the threshold of an available data amount), the number being limited to, for example, a size of a message 3. Furthermore, the preset conditions may further include: a time T having passed since a last time of uplink data transmission (such as exceeding the threshold of an interval time of data transmission). A value of T may be configured by the network device, or may be defined in a protocol or standard. Reference may be made to a size of a period of an existing BSR for a size of T.

In an embodiment, if the user equipment determines to enter the active state, operation 605 may be executed.

605: the user equipment transmits the data and the RRC request message to the network device in the inactive state.

In an embodiment, once the user equipment determines needing to enter the active state, it may execute an RRC connection establishment/resume/reconfiguration procedure to enter the RRC active state.

It should be noted that the embodiments of this disclosure are only illustrated above; however, this disclosure is not limited thereto. And appropriate variants may be made by those skilled in the art according to what is described above, without being limited to the disclosure contained in the above implementations. For example, an order of execution of the operations in FIGS. 4-6 may be appropriately adjusted; and furthermore, some other operations may be added, or some of these operations may be reduced. And appropriate variants may be made by those skilled in the art according to what is described above, without being limited to the above disclosure.

It can be seen from the above embodiments that in an inactive state, the user equipment determines whether to maintain in the inactive state or enter an active state according to indication information of a network device or one or more parameters configured by the network device. Hence, data transmission may be performed in an appropriate state, without needing to restart connection at each time of data transmission; saved resources may be used for the data transmission, and time needed in performing identical data transmission may be reduced.

Embodiment 2

These embodiments of this disclosure provide a data receiving method, applicable to a data receiving device side (such as a network device), with contents identical to those in Embodiment 1 being not going to be described herein any further.

Figure 8:
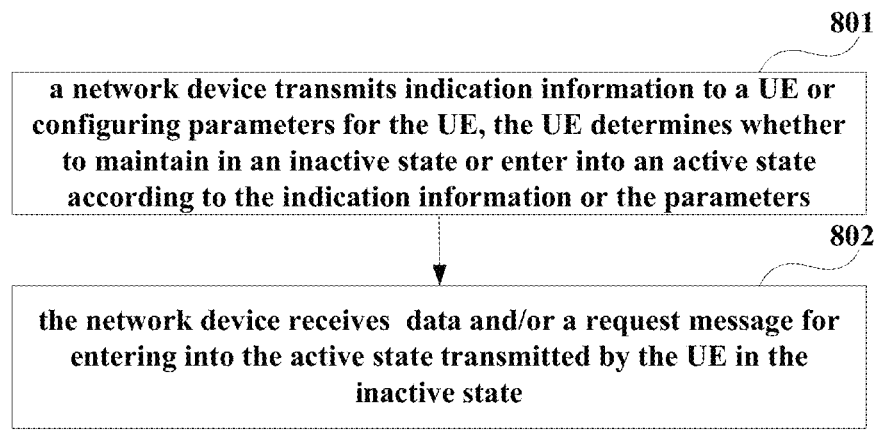
FIG. 8 is a schematic diagram of the data receiving method of Embodiment 2 of this disclosure.

FIG. 8 is a flowchart of the data receiving method of the embodiment of this disclosure. As shown in FIG. 8, the data receiving method includes:

801: a network device transmits indication information to a user equipment or configures one or more parameters for the user equipment, so that the user equipment determines whether to maintain in an inactive state or enter an active state according to the indication information or the parameters; and

802: the network device receives data and/or a request message for entering the active state transmitted by the user equipment in the inactive state.

In an embodiment, when the user equipment transmits the data and/or an RRC request message to the network device in an inactive state, the user equipment may further transmit data amount information indicating a total amount or a maintaining amount of the data. And the network device may also receive the data amount information indicating a total amount or a maintaining amount of the data.

In one embodiment, when the user equipment has data needing to be transmitted, in the inactive state, the user equipment may transmit the data and the request message for entering the active state to the network device. And the network device may transmit a response message to the user equipment, indicating that the user equipment maintains in the inactive state or enters the active state.

In an embodiment, when the response message indicates that the user equipment is maintained in the inactive state, the network device may further receive the data transmitted by the user equipment in the inactive state.

The network device may further preconfigure a time and/or the number of times for the user equipment, such that the user equipment transmits the data within the time and/or the number of times, and transmits the data and the request message for entering the active state when the preconfigured time and/or number of times is/are exceeded.

In another embodiment, when the user equipment has data needing to be transmitted, in the inactive state, the user equipment may transmit the data to the network device. And the network device may, according to information provided by the user equipment and/or resources of a network system, indicate whether the user equipment enters the active state or maintains in the inactive state.

In an embodiment, in a case where the network device explicitly indicates that the user equipment enters the active state, the user equipment, in the inactive state, transmits the data and the request message for entering the active state to the network device.

In another embodiment, when the user equipment has data needing to be transmitted, in the inactive state, the user equipment may transmit the data to the network device. And when one or more preset conditions is/are satisfied, the user equipment, in the inactive state, transmits the data and the request message for entering the active state to the network device.

In an embodiment, the network device may preconfigure one or more parameters for the user equipment. The parameters may include one or more of the following: a threshold of an available data amount, a threshold of an interval time of data transmission, a minimum time interval between consecutive packets, and the number of packets. However, this disclosure is not limited thereto.

It can be seen from the above embodiments that in an inactive state, the user equipment determines whether to maintain in the inactive state or enter an active state according to indication information of a network device or one or more parameters configured by the network device. Hence, data transmission may be performed in an appropriate state, without needing to restart connection at each time of data transmission; saved resources may be used for the data transmission, and time needed in performing identical data transmission may be reduced.

Embodiment 3

These embodiments of this disclosure provide a data transmitting apparatus, which may be, for example, a user equipment, or may be one or more parts or components configured in a user equipment. And contents in these embodiments identical to those in Embodiment 1 shall not be described herein any further.

Figure 9:
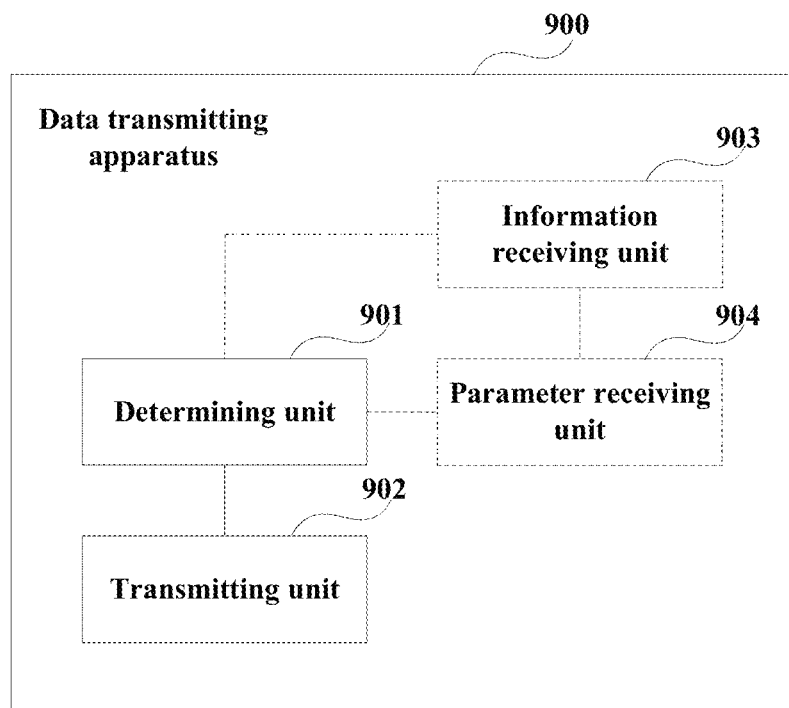
FIG. 9 is a schematic diagram of the data transmitting apparatus of Embodiment 3 of this disclosure.

FIG. 9 is a schematic diagram of the data transmitting apparatus of the embodiment of this disclosure. As shown in FIG. 9, a data transmitting apparatus 900 includes:
- a determining unit 901 configured to, in an inactive state, determine whether to maintain in the inactive state or enter an active state according to indication information of a network device or one or more parameters configured by the network device; and
- a transmitting unit 902 configured to, in the inactive state, transmit data and/or a request message for entering the active state to the network device.

In one embodiment, the transmitting unit 902 may further be configured to, in a case where the data are needed to be transmitted, in the inactive state, transmit the data and the request message for entering the active state to the network device.

In one embodiment, as shown in FIG. 9, the data transmitting apparatus 900 may further include:
- an information receiving unit 903 configured to receive the indication information transmitted by the network device according to the request message; the indication information may be carried by one or more of the following messages: an RRC rejection message, an RRC connection reconfiguration message, a newly-defined message, and an MAC CE; however, this disclosure is not limited thereto.

The transmitting unit 902 may further be configured to, when the indication information indicates maintaining in the inactive state, transmit the data to the network device in the inactive state.

For example, the transmitting unit 902 may transmit the data to the network device at a preconfigured time, and/or may transmit the data to the network device within a preconfigured number of times; the preconfigured time and/or the preconfigured number of times may be configured by the network device.

And the transmitting unit 902 may further be configured to, in a case where the preconfigured time and/or the preconfigured number of times is/are exceeded, transmit the data and the request message for entering the active state to the network device in the inactive state.

In an embodiment, the transmitting unit 902 may further be configured to, when the data need to be transmitted, transmit the data to the network device in the inactive state.

In another embodiment, the information receiving unit 903 may further receive the indication information transmitted by the network device according to information provided by the user equipment and/or resources in a network system; the indication information may be carried by one or more of the following messages: an RRC connection establishment message, an RRC connection resume message, an RRC connection reconfiguration message, a newly-defined message, and an MAC CE; however, this disclosure is not limited thereto.

The determining unit 901 may further be configured to, according to the indication information, determine to enter the active state; and the transmitting unit 902 may further be configured to, when it is determined to enter the active state, in the inactive state, transmit the data and the request message for the active state.

In a further embodiment, as shown in FIG. 9, the data transmitting apparatus 900 may further include:
- a parameter receiving unit 904 configured to receive the one or more parameters configured by the network device; the parameters configured by the network device include one or more of the following: a threshold of an available data amount, a threshold of an interval time of data transmission, a minimum time interval between consecutive packets, and the number of packets; however, this disclosure is not limited thereto.

The determining unit 901 may further be configured to determine whether one or more predetermined conditions is/are satisfied according to the parameters configured by the network device, and determine needing to enter the active state when the one or more predetermined conditions is/are satisfied;

And the transmitting unit 902 may further be configured to, in a case where it is determined to enter the active state, transmit the data and the request message for entering the active state to the network device in the inactive state.

It should be noted that the components or modules related to this disclosure are only illustrated above; however, this disclosure is not limited thereto. And the data transmitting apparatus 900 may further include other components or modules, and reference may be made to related techniques for particular contents of these components or modules.

It can be seen from the above embodiments that in an inactive state, the user equipment determines whether to maintain in the inactive state or enter an active state according to indication information of a network device or one or more parameters configured by the network device. Hence, data transmission may be performed in an appropriate state, without needing to restart connection at each time of data transmission; saved resources may be used for the data transmission, and time needed in performing identical data transmission may be reduced.

Embodiment 4

These embodiments of this disclosure provide a data receiving apparatus, which may be a network device, or may be one or more parts or components configured in a network device. And contents in these embodiments identical to those in embodiments 1 and 2 shall not be described herein any further.

Figure 10:
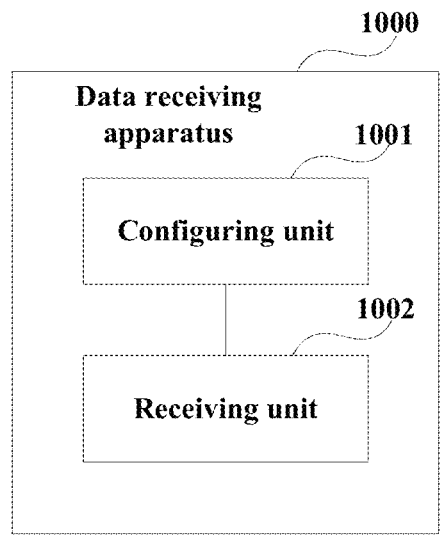
FIG. 10 is a schematic diagram of the data receiving apparatus of Embodiment 4 of this disclosure.

FIG. 10 is a schematic diagram of the data receiving apparatus of the embodiment of this disclosure. As shown in FIG. 10, a data receiving apparatus 1000 includes:

a configuring unit 1001 configured to transmit indication information to a user equipment or configure one or more parameters for the user equipment, so that the user equipment determines whether to maintain in an inactive state or enter an active state according to the indication information or the parameters; and a receiving unit 1002 configured to receive data and/or a request message for entering the active state transmitted by the user equipment in the inactive state. In one embodiment, the configuring unit 1001 may transmit the indication information to the user equipment according to the request message; the indication information may be carried by one or more of the following messages: an RRC rejection message, an RRC connection reconfiguration message, a newly-defined message, and an MAC CE; however, this disclosure is not limited thereto.

For example, the indication information may be contained in a newly-added IE in the RRC rejection message or the RRC connection reconfiguration message. And the indication information may further include assistant information indicating whether to maintain in the inactive state or enter the active state; for example, it may include a rejection cause.

The receiving unit 1002 may further be configured to, when the indication information indicates the user equipment to maintain in the inactive state, receive the data transmitted by the user equipment in the inactive state.

The configuring unit 1001 may further be configured to preconfigure the user equipment with a time and/or the number of times, so that the user equipment transmits the data at the time and/or within the number of times, and in a case where the time and/or the number of times is/are exceeded, transmits the data and the request message for entering the active state.

In another embodiment, the configuring unit 1001 may transmit the indication information according to information provided by the user equipment and/or one or more resources of a network system; the indication information may be carried by one or more of the following messages: an RRC connection establishment message, an RRC connection resume message, an RRC connection reconfiguration message, a newly-defined message, and an MAC CE; however, this disclosure is not limited thereto.

For example, the indication information may be contained in a newly-added IE in the RRC connection establishment message, or the RRC connection resume message, or the RRC connection reconfiguration message.

In a further embodiment, the configuring unit 1001 may preconfigure one or more parameters for the user equipment, and the user equipment may determine to maintain in the inactive state or enter the active state according to the configured parameters. The parameters may include one or more of the following: a threshold of an available data amount, a threshold of an interval time of data transmission, a minimum time interval between consecutive packets, and the number of packets; however, this disclosure is not limited thereto.

It should be noted that the components or modules related to this disclosure are only illustrated above; however, this disclosure is not limited thereto. And the data receiving apparatus 1000 may further include other components or modules, and reference may be made to related techniques for particular contents of these components or modules.

It can be seen from the above embodiments that in an inactive state, the user equipment determines whether to maintain in the inactive state or enter an active state according to indication information of a network device or one or more parameters configured by the network device. Hence, data transmission may be performed in an appropriate state, without needing to restart connection at each time of data transmission; saved resources may be used for the data transmission, and time needed in performing identical data transmission may be reduced.

Embodiment 5

These embodiments of this disclosure provide a communication system, reference being able to be made to FIG. 1, and contents identical to those in embodiments 1-4 being not going to be described herein any further. In an embodiment, the communication system 100 may include:

a user equipment 102 configured with the data transmitting apparatus 900 as described in Embodiment 3; and a network device 101 configured with the data receiving apparatus 1000 as described in Embodiment 4.

The embodiment of this disclosure further provides a user equipment; however, this disclosure is not limited thereto, and may also be other devices.

Figure 11:
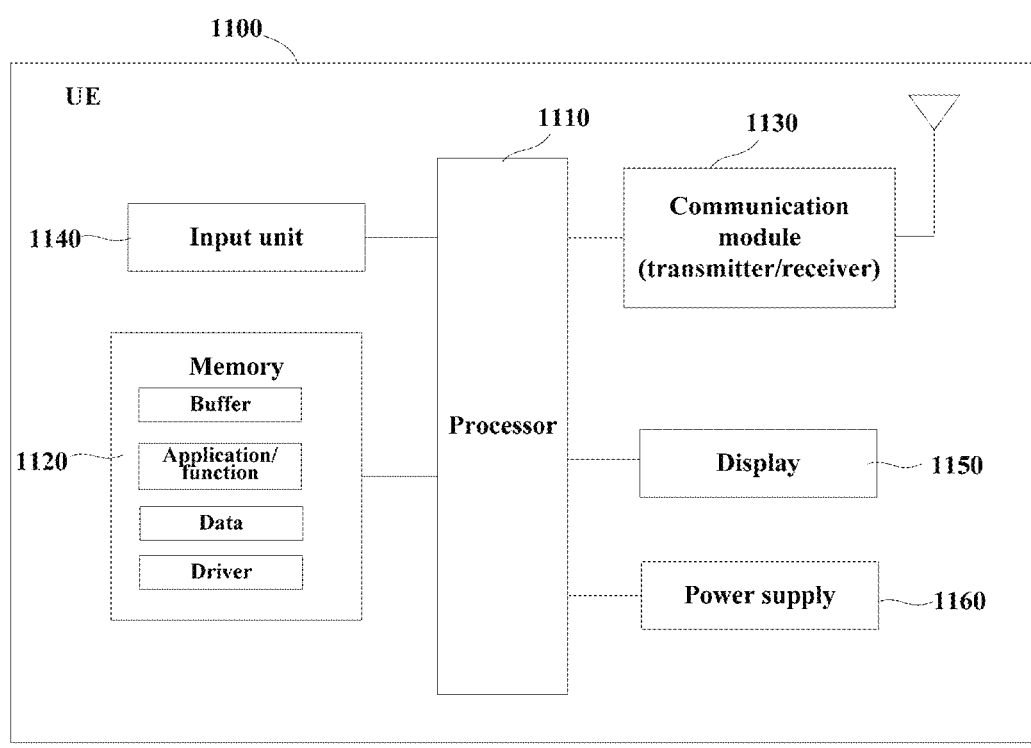
FIG. 11 is a schematic diagram of the user equipment of Embodiment 5 of this disclosure.

FIG. 11 is a schematic diagram of the user equipment of the embodiment of this disclosure. As shown in FIG. 11, a user equipment 1100 may include a processor 1110 and a memory 1120, the memory 1120 storing data and programs and being coupled to the processor 1110. It should be noted that this figure is illustrative only, and other types of structures may also be used, so as to supplement or replace this structure and achieve a telecommunications function or other functions.

The processor 1110 may be configured to execute the functions of the data transmitting apparatus 900. For example, the processor 1110 may be configured to perform the following control: in an inactive state, determining whether to maintain in the inactive state or enter an active state according to indication information of a network device or one or more parameters configured by the network device; and in the inactive state, transmitting data and/or a request message for entering the active state to the network device.

As shown in FIG. 11, the user equipment 1100 may further include a communication module 1130, an input unit 1140, a display 1150 and a power supply 1160. Functions of the above components are similar to those in the relevant art, and shall not be described herein any further. It should be noted that the user equipment 1100 does not necessarily include all the parts shown in FIG. 11, and the above components are not necessary; and furthermore, the user equipment 1100 may include parts not shown in FIG. 11, and the relevant art may be referred to.

The embodiment of this disclosure further provides a network device, such as a base station; however, this disclosure is not limited thereto, and may also be other network devices.

Figure 12:
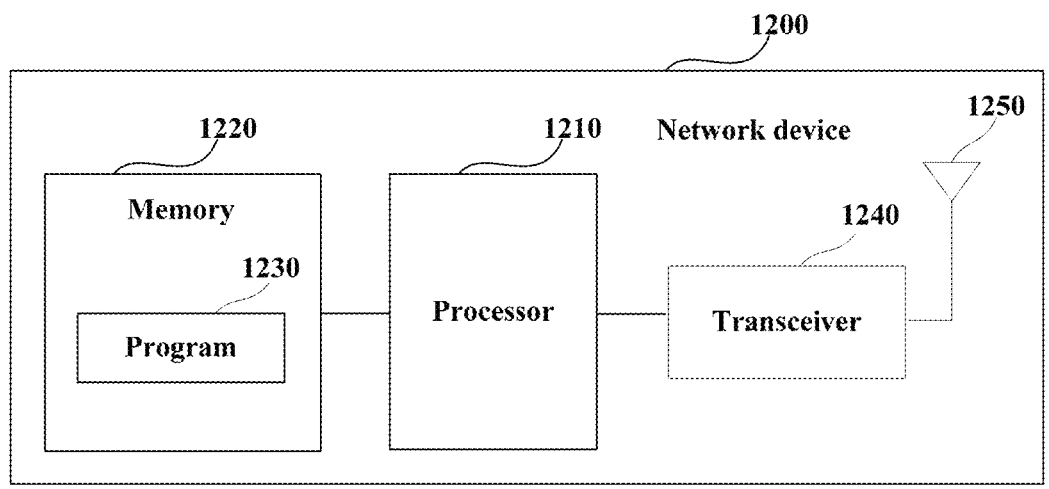
FIG. 12 is a schematic diagram of the network device of Embodiment 5 of this disclosure.

FIG. 12 is a schematic diagram of a structure of the network device of the embodiment of this disclosure. As shown in FIG. 12, a network device 1200 may include a processor 1210 (such as a central processing unit (CPU)) and a memory 1220, the memory 1220 being coupled to the processor 1210. The memory 1220 may store various data, and furthermore, it may store a program 1230 for data processing, and execute the program 1230 under control of the processor 1210.

The processor 1210 may be configured to execute the functions of the data receiving apparatus 1000. For example, the processor 1210 may be configured to execute the program 1230 to perform the following control: transmitting indication information to a user equipment or configuring one or more parameters for the user equipment, so that the user equipment determines whether to maintain in an inactive state or enter an active state according to the indication information or the parameters; and receiving data and/or a request message for entering the active state transmitted by the user equipment in the inactive state.

Furthermore, as shown in FIG. 12, the network device 1200 may include a transceiver 1240, and an antenna 1250, etc. Functions of the above components are similar to those in the relevant art, and shall not be described herein any further. It should be noted that the network device 1200 does not necessarily include all the parts shown in FIG. 12, and furthermore, the network device 1200 may include parts not shown in FIG. 12, and the relevant art may be referred to.

An embodiment of the present disclosure provides a computer readable program code, which, when executed in a transmitting device or a user equipment, may cause the transmitting device or the user equipment to carry out the data transmitting method as described in Embodiment 1.

An embodiment of the present disclosure provides a computer storage medium, including a computer readable program code, which may cause a transmitting device or a user equipment to carry out the data transmitting method as described in Embodiment 1.

An embodiment of the present disclosure provides a computer readable program code, which, when executed in receiving device or a network device (such as a base station), may cause the receiving device or the network device (such as a base station) to carry out the data receiving method as described in Embodiment 2.

An embodiment of the present disclosure provides a computer storage medium, including a computer readable program code, which may cause a receiving device or a network device (such as a base station) to carry out the data receiving method as described in Embodiment 2.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 9 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the accompanying drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the accompanying drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A data transmitting apparatus, comprising:
    processor circuitry configured to:
        in a radio resource control (RRC) state other then an RRC_connected state, determine, based on a threshold of available data amount configured by a network device via broadcast, that
            the RRC state other than the RRC_connected state is maintained and data is transmitted when an available data amount is less than or equal to the threshold, and
            data is transmitted after entering an RRC_connected state when an available data amount is greater than the threshold; and
    a transmitter configured to:
        transmit, in the RRC state other than the RRC_connected state, data and a request message for entering the RRC_connected state to the network device only when it is determined to maintain the RRC state other than the RRC_connected state and to transmit data; and
        enter the RRC_connected state and transmit data to the network device when it is determined to transmit data after entering the RRC_connected state, and
    wherein in a case where the transmitter transmitted the data and the request message, the data transmitting apparatus is further configured to determine whether to maintain in the RRC state other than the RRC_connected state or enter the RRC_connected state according to a response message form the network device.

2. The data transmitting apparatus according to claim 1, wherein the transmitter is further configured to transmit indication about size information of subsequent data or status information of data.

3. A data receiving apparatus, comprising:
a transmitter configured to transmit via broadcast a threshold of available data amount to user equipment, wherein the threshold is used for determining whether to maintain in a radio resource control (RRC) state other than an RRC_connected state and transmit data, or whether to transmit data after entering an RRC_connected state; and
a receiver configured to receive data and a request message for entering the RRC_connected state transmitted by the user equipment in the RRC state other than the RRC_connected state, or to receive data transmitted by the user equipment in the RRC active state,
wherein the transmitter is further configured to transmit a response message to the user equipment, indicating that the user equipment maintains in the RRC state other than the RRC_connected or enters the RRC_connected state.

4. A communication system, comprising:
a user equipment configured to:
in a radio resource control (RRC) state other than an RRC_connected state, determine, based on a threshold of available data amount configured by a network device via broadcast, that
the radio resource control (RRC) state other than an RRC_connected state is maintained and data is transmitted when available data amount is less than or equal to the threshold; and
data is transmitted after entering an RRC_connected state when available data amount is greater than the threshold; and
the user equipment being further configured to:
transmit, in the RRC state other than the RRC_connected state, data and a request message for entering the RRC_connected state to the network device only when it is determined to maintain the RRC state other than the RRC_connected state and to transmit data; and
enter the RRC_connected state and transmit data to the network device when it is determined to transmits data after entering the RRC_connected state, and
wherein in a case where the transmitter transmitted the data and the request message, the data transmitting apparatus is further configured to determine whether to maintain in the RRC state other than the RRC_connected state or enter the RRC_connected state according to a response message from the network device; and
the network device being configured to:
transmit via broadcast a threshold of available data amount to the user equipment, wherein the threshold is used for determining whether to maintain in a radio resource control (RRC) state other than an RRC_connected state and transmit data, or whether to transmit data after entering an RRC_connected state;
receive data and a request message for entering the RRC_connected state transmitted by the user equipment in the RRC state other than the RRC_connected state, or to receive data transmitted by the user equipment in the RRC active state,
the network device being further configured to transmit a response message to the user equipment, indicating that the user equipment maintains in the RRC state other than the RRC_connected or enters the RRC_connected state.

* * * * *